United States Patent [19]

Lundberg et al.

[11] 4,183,406

[45] Jan. 15, 1980

[54] METHOD OF TREATING A BOREHOLE USING GELLABLE POLYMERS

[75] Inventors: Robert D. Lundberg, Bridgewater, N.J.; Dennis E. O'Brien, Houston, Tex.; Henry S. Makowski, Scotch Plains; Robert R. Klein, Berkley Heights, both of N.J.

[73] Assignee: Exxon Production Research Company, Houston, Tex.

[21] Appl. No.: 930,121

[22] Filed: Aug. 1, 1978

[51] Int. Cl.² .......................................... E21B 33/138
[52] U.S. Cl. .................................... 166/295; 166/268; 175/72
[58] Field of Search ............... 166/294, 295, 274, 275, 166/270, 268; 175/65, 72

[56] References Cited

U.S. PATENT DOCUMENTS

| | | | |
|---|---|---|---|
| 2,032,826 | 3/1936 | Ambrose et al. | 166/294 |
| 2,842,206 | 7/1958 | Bearden et al. | 166/295 |
| 3,087,544 | 4/1963 | Forsman | 166/295 |
| 3,100,527 | 8/1963 | Hilton, Jr. et al. | 166/295 |
| 3,103,248 | 9/1963 | O'Brien | 166/295 |
| 3,123,158 | 3/1964 | Gallus | 166/295 X |
| 3,181,611 | 5/1965 | Dollarhide | 166/295 |
| 3,490,535 | 1/1970 | Messenger | 166/292 |
| 3,537,522 | 11/1970 | Harnsberger | 166/295 |
| 3,666,430 | 5/1972 | Osmond et al. | 44/7 D |
| 3,931,021 | 1/1976 | Lundberg | 252/32.5 |

*Primary Examiner*—Stephen J. Novosad
*Attorney, Agent, or Firm*—Robert B. Martin; Gary D. Lawson

[57] ABSTRACT

Improvements in the treatment of wells that penetrate subterranean formations are accomplished through the use of a polymer solution which includes a neutralized ionomeric polymer dissolved in an organic solvent and a polar cosolvent. The polymer has a backbone that is substantially soluble in the organic solvent and pendant ionomeric groups that are substantially insoluble in the organic solvent. The polar cosolvent solubilizes the pendant ionomeric groups such that the polymer solution upon introduction into the well has a viscosity less than about 20,000 centipoises and upon mixing with water the polar cosolvent is taken up by the water causing the polymer to aggregate and increase in viscosity sufficient to form a plug. The polymer solution may be used in well drilling operations, well completion operations, and secondary recovery operations.

28 Claims, 2 Drawing Figures

METHOD OF TREATING A BOREHOLE USING GELLABLE POLYMERS

BACKGROUND OF THE INVENTION

1. Field of the Invention

This invention relates to treating a well which penetrates a subterranean formation and more particularly to introduction of a fluid medium into a borehole in the subterranean formation to form a fluid flow blocking means.

2. Description of the Prior Art

During the drilling of an oil or gas well it is sometimes necessary to introduce fluids into the well to kill the well. This situation may occur if a formation fluid influx cannot be contained by closing the blowout preventers or by circulating the high density mud. For example, when an unusually high pressure formation is encountered, it may be necessary to employ drilling mud at such high weight that a formation above the high pressure zone is fractured. This fractured zone then becomes a "lost zone" into which mud flows at such a high rate that "lost circulation" occurs. The lost circulation may be so severe that it ultimately becomes impossible to maintain a column of mud above the high pressure zone sufficient to impart the necessary hydrostatic head to offset the high pressures in the high pressure zone. As this occurs, the well becomes increasingly susceptible to blowout into the lost zone or to the surface.

To overcome these wellbore problems, it has been suggested to plug cracks, crevices and fissures in the leaky portion of the formation and if loss of circulation becomes too severe, to plug the wellbore.

Various techniques have been suggested for preventing lost circulation. Generally lost circulation is controlled by reducing the mud density or by adding various materials to the drilling mud. These materials have frequently been of a character intended to form a type of mat intended to plug the leaky formation and thus retard or prevent the escape of circulation fluid. Examples of lost circulation materials include a broad range of fibrous, flaky, or granular materials such as cellophane, waste paper, walnut hulls, or cotton lint. It has also been suggested to introduce into the well a hydratable material such as bentonite clay which gels or stiffens into a semi-solid mass upon mixing with water.

In some cases methods and compositions heretofore used for preventing lost circulation have proven successful. However, under varying circumstances these methods have been inadequate to prevent loss of drilling fluids.

Sometimes it is necessary to plug the wellbore in order to prevent loss of drilling fluids or influx of formation fluids into the borehole. Various well control techniques have been proposed for plugging wells. One suggested technique involves placing a high density barite slurry (barium sulfate) in the annulus adjacent the high pressure zone to provide the extra hydrostatic head needed to stop or prevent formation fluid influx. If the barite slurry remains deflocculated after placement at the bottom of the well, the barite settles uniformly to form a hard plug. One problem with using barite to form a plug is that the barite's ability to plug varies greatly depending upon the formation temperature, the operating conditions, and the quality of barite used. For example, it is sometimes difficult to plug a well in the presence of a significant flow movement in the wellbore. If the fluid influx is not killed immediately by the hydrostatic head of the barite slurry, the settling barite will usually not stop the unwanted flow.

Another proposed well control technique is to inject a highly viscous fluid into the wellbore. A well known water-sensitive fluid for plugging a wellbore is a slurry of bentonite dispersed in diesel oil, a fluid commonly called "gunk." The gunk is placed in the well by circulating the slurry with spacers before and after to segregate the material from the water-based drilling fluid in the drill pipe. Upon mixing with water and mud in the annulus, the bentonite hydrates to form an extremely thick paste. The highly viscous slurry slows the formation flow and, if sufficient slurry enters the annulus, provides a complete seal. One problem with the use of gunk is that the material is highly dependent upon the amount of water that is mixed with it. It is difficult for gunk to form an adequate plug if it is exposed to either too much or too little water in the wellbore. The techniques using gunk are therefore susceptible to erratic field performance.

There is a continuing need for an improved method of forming a plug in cracks and crevices of leaky formations to prevent lost circulation and forming a plug in a wellbore which adequately seals the bottom of the well against high pressure gradients.

SUMMARY OF THE INVENTION

The present invention relates to treatment of wells using a particular class of polymer solutions. The method may be used in secondary recovery operations, well drilling operations and well completion operations.

In carrying out one embodiment of this invention, a polymer solution is introduced into the well at the desired location for plugging the wellbore. The polymer solution comprises a neutralized ionomeric polymer dissolved in a nonpolar organic liquid and a polar cosolvent. The ionomeric polymer is characterized as having a backbone that is substantially soluble in the organic liquid and pendant ionic groups that are substantially insoluble in the organic liquid. The polar cosolvent solubilizes the pendant ionomeric groups such that the polymer solution introduced into the well has a viscosity less than about 20,000 centipoises (cps). Upon mixing with water, the polar cosolvent in the polymer solution is taken up by the water and the polymer aggregates and increases the solution viscosity. The polymer solution upon mixing with only 5 percent water based on the volume of the polymer solution forms a gel having sufficient shear strength to form a plug in the well.

In a preferred method of plugging a well, a polymer solution comprising diesel oil, sulfonated EDPM and methanol is injected into the wellbore down a drill pipe. The methanol concentration is less than about 15 weight percent of the polymer solution and the polymer concentration ranges from about 0.1 to about 20 weight percent of the polymer solution. The water in the wellbore mixes with the polymer solution, extracts the alcohol from the diesel phase, and causes the polymer to cross-link. The cross-linked polymer binds the diesel into a jelly-like material which can have a shear strength well above 30 pounds per square foot (146 kilograms per square meter).

The aqueous fluid required to cause the polymer to cross-link may be injected before, simultaneously with, or after, the injection of the polymer solution. The aqueous fluid may also be aqueous formation fluid which flows from the formation into the wellbore.

The polymer solutions of this invention are advantageously used as well treating fluids because the polymer solution is capable of changing from a low viscosity system into an extremely viscous gel with relatively small amounts of water. It is possible to achieve increases in the shear strength by factors of 10,000 or more by addition of only 5 to 15% water based on the polymer solution volume. After initial thickening is achieved, the amount of additional water mixed with the gel mass does not significantly effect the shear strength.

DESCRIPTION OF THE PREFERRED EMBODIMENTS

In the rotary drilling of a well a drill string is employed which extends from the top to the bottom of the hole being drilled. This drill string is a hollow tube and carries on its lower end a drill bit having one or more openings for discharge of drilling fluid from the drill string out into the wellbore. The drilling rig on the surface has devices for both rotating and raising or lowering the drill string in the wellbore. Typically, drilling fluid ("mud") is withdrawn from a "mud pit" that services the well and is pumped into the drill string via a rotary connection. The drilling mud is circulated downward through the drill string and out into the wellbore outside the drill string through the outlet ports in the drill bit. The drilling mud then flows to the surface of the well through the annulus between the drill string and the wall of the hole. At the surface the mud is passed through suitable separation devices where suspended drill cuttings are separated and hence the drill fluid is passed into the mud pit where it is withdrawn for reintroduction into the drill string.

During normal drilling operations the drilling fluid is circulated downwardly through the drill string and upwardly through the annulus as described above. When it is desired to form a plug in the well, for example, as when a high pressure zone is suspected or encountered or when a lost circulation zone exists above a high pressure zone, the introduction of the drilling fluid into the drill string is temporarily suspended. A polymer solution of this invention, formulated as described in detail hereinafter, is introduced into the drill string in the same manner as drilling mud and circulated downwardly through the drill string and into the wellbore outside or below the drill string. The polymer solution on contact with water increases in viscosity and plugs the wellbore.

If there is inadequate water in the well or insufficient mixing in the annulus between the water and the polymer solution, water or other aqueous liquid may be pumped into the drill string along with the polymer solution provided mixing in the drill pipe is insufficient to cause significant cross-linking. Upon mixing at the bottom of the string the polymer solution increases in viscosity and plugs the wellbore or lost circulation zone. The aqueous solution and the polymer solution travel down the drill pipe with only a small amount of mixing so that the polymer can be pumped down the well. At the bottom of the drill pipe, the two fluids are forced through a flow restriction such as a nozzle and are thoroughly mixed by the high shear and turbulence. This mixing causes the polymer solution to rapidly thicken into a jelly-like material having a shear strength above 30 pounds per square foot (146 kilograms/m$^2$).

Figure 1:
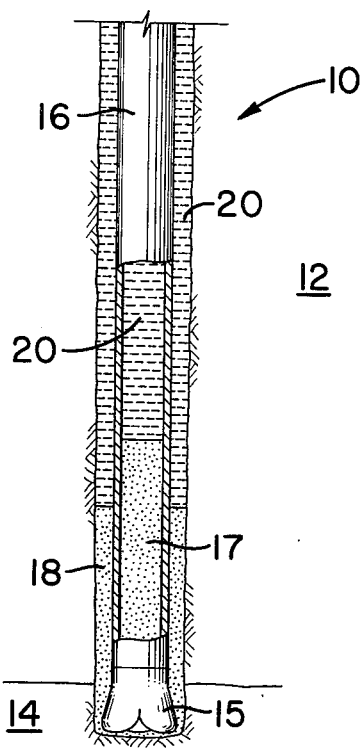
FIG. 1 is a schematic illustration of a well, partly in section, showing the polymer solution within the wellbore.

With reference to FIG. 1, a preferred technique will be described for locating the polymer solution in the well. Shown in FIG. 1 is a well 10 which extends through a lost circulation zone 12 and penetrates into the top of a high pressure zone 14. Located within the well is a drill string 16 which is equipped at the lower end thereof with a suitable drill bit 15. In accordance with the preferred embodiment of this invention, an organic liquid, preferably diesel oil, containing a polar solvent, preferably methanol, and an ionomeric polymer such as neutralized sulfonated EDPM is pumped into a drill pipe through either a cementing head or through a standpipe and kelly (not shown).

The amount of polymer solution 17 introduced into the well will depend upon local conditions such as the pressure encountered in the active zone, the distance between the active zone and the lost circulation zone (if such a zone is present), the weight of the drilling mud being used, and the depth of the active zone on the bottom of the well. For typically used bit and drill pipe sizes a plug 18 of approximately 50 to 1000 feet (15 to 300 meters) in length is formed in the annulus.

When the mud in the drill pipe contains water, the mixing of the water with the polymer solution may cause the polymer to cross-link to such a degree that problems exist in pumping the polymer solution down the drill pipe and out through the bit. In that event, a non-aqueous spacer solution such as diesel oil 20 may be injected ahead of and behind the polymer solution to prevent water from contacting the polymer solution until the polymer is out of the drill pipe.

In general, the ionomeric polymers suitable in the practice of this invention have an organic backbone that is substantially soluble in the organic solvent and pendant-ionomeric groups that are substantially insoluble in the organic solvent. The polymers preferably comprise from about 10 to about 200 milliequivalents (meq.) pendant ionomeric groups per 100 grams (gms.) of polymer, more preferably from 10 to 100 meq. pendant ionomeric groups. The ionic groups may be conveniently selected from the group consisting of carboxylate, phosphonate, and sulfonate, preferably sulfonate groups. The ionomers utilized in the instant invention are neutralized with a counterion selected from the group comprising metal, ammonium, or amine counterions including materials selected from Groups IA, IIA, IB, and IIB of the Periodic Table of the Elements, as well as lead, tin, antimony, ammonium and iron counterions. The preferred cations are zinc, magnesium, sodium, potassium, ammonium, barium, calcium and lead, with zinc and magnesium being most preferred.

Neutralization of the cited polymers with appropriate metal hydroxides, metal acetates, metal oxides or ammonium hydroxide etc. can be conducted by means well known in the art. For example, the sulfonation process with Butyl rubber containing 0.3 to 1.0 mole percent unsaturation can be conducted in a suitable solvent such as toluene with acetyl sulfate as the sulfonating agent such as described in U.S. Pat. No. 3,836,511. The resulting sulfonate precursor can then be neutralized with a number of different neutralization agents such as sodium phenolate and similar metal salts. The amounts of such neutralization agents employed will normally be stiochiometrically equal to the amount of sulfonate precursor groups in the polymer plus any unreacted reagent which still is present. It is preferred that the amount of neutralizing agent be equal to the molar amount of sulfonating agent originally employed plus 10% more to insure full neutralization. However, more neutralization agent can be used. Sufficient neutralization agent is necessary to effect at least 50% neutralization of the sulfonate precursor groups present in the polymer, preferably at least 90%, and most preferably essentially complete neutralization of such precursor groups should be effected.

The degree of neutralization of said ionomeric groups may vary from 50 to 500 mole %, preferably 90 to 200%. Most preferably the degree of neutralization is substantially complete and no substantial free acid and no substantial excess of the base other than that needed to insure neutralization is present. Thus, the polymers used in the instant invention comprise substantially neutralized pendant groups and, an excess of the neutralizing material may be used without defeating the objects of the instant invention.

The preferred level of metal groups pendant to the polymer backbone ranges from 10 meq./100 gms up to 200 meq./100 gms of polymer. Similarly, the level of polymer in the mixed solvent may vary over a wide range, for example, from about 1 weight percent up to 20 weight percent. Similarly, the alcohol level may vary from below 2 percent to less than 15 weight percent based on total solvent (hydrocarbon solvent and alcohol).

The ionomeric polymers of the instant invention may vary in number average molecular weight from 1,000 to 10,000,000, preferably from 5,000 to 500,000, most preferably from 10,000 to 200,000. These polymers may be prepared by methods known in the art; for example, see U.S. Pat. No. 3,642,728, hereby incorporated by reference.

It is evident that the polymers covered within this invention encompass a broad class of hydrocarbon polymer systems. It is important that these hydrocarbon polymer backbones (in the absence of the ionic groups) be soluble in the organic solvent. To achieve the desired solubility, it is required that the polymer to be employed possess a degree of polarity consistent with the organic solvent. This solubility relationship can readily be established by those skilled in the art simply by using appropriate texts (e.g. Polymer Handbook, Edited by Brandrup and Immergut, Interscience Publishers, 1967, section IV-341). The solubility relationship between the polymer and organic solvent can also be determined experimentally by observing whether the selected polymer will be soluble in the solvent at a level of 1 gm. of polymer per 100 ml of solvent. If the polymer is soluble in the organic solvent, this demonstrates that it is an appropriate backbone for modification with ionic groups to achieve the objectives of this invention. It is also apparent that polymers which are too polar will not be soluble in the relatively nonpolar organic solvents of this invention. Only those polymer backbones (i.e. as measured in the absence of ionic groups) having a solubility parameter less than 10.5 are suitable in this invention. This precludes the use of such polymers as polyvinyl alcohol, polyacrylonitrile etc. Also highly crystalline polymers should be avoided since they tend not to be soluble in the relatively nonpolar organic solvents employed herein. Therefore, acceptable polymers employed in this invention should possess a level of crystallinity of less than 25%. Thus, acceptable polymers for this invention can be considered substantially noncrystalline.

The types of ionic polymers used in the instant invention are described in several issued or pending patents (see for example, U.S. Pat. No. 3,931,021, herein incorporated by reference). The preferred ionomers are those based on sulfonated elastomers which are described in U.S. Pat. No. 3,642,728, herein incorporated by reference. Processes for preparing this preferred class of sulfonated materials are described in pending U.S. patent applications Ser. Nos. 855,722 and 855,701, herein incorporated by reference. Sulfonated plastics are also a preferred class of ionomers and the procedures for preparation of these materials are described in U.S. Pat. No. 3,870,841, herein incorporated by reference.

The ionomeric polymers may be incorporated into the organic solvent at a level of from 0.1 to 20 weight %, preferably from 0.2 to 10 weight %, most preferably from 0.5 to 5 weight %, based on the organic solvent and the polar cosolvent.

Specific examples of preferred ionomeric polymers that are useful in the instant invention include sulfonated polystryrene, sulfonated poly-t-butyl styrene, sulfonated polyethylene (substantially noncrystalline), and sulfonated polyethylene copolymers, sulfonated polypropylene (substantially noncrystalline), and sulfonated polypropylene copolymers, sulfonated styrene-methyl methacrylate copolymers, (styrene)-acrylic acid copolymers, sulfonated polyisobutylene, sulfonated ethylene-propylene terpolymers, sulfonated polyisoprene, sulfonated polyvinyl toluene, and sulfonated polyvinyl toluene copolymers.

The ionomeric polymers of the instant invention may be prepared prior to incorporation into the organic solvent. For example, preferably the acid derivative is neutralized immediately after preparation. Hence, if the sulfonation of polystyrene is conducted in solution, the neutralization of the acid derivative can be conducted immediately following the sulfonation procedure. The neutralized polymer may then be isolated by means well known to those skilled in the art, i.e., coagulation, steam stripping, or solvent evaporation, because the neutralized polymer has sufficient thermal stability to be dried for employment at a later time in the process of the instant invention. It is well known that the unneutralized sulfonic acid derivatives do not possess good thermal stability and the above operations avoid that problem.

It is also possible to neutralize the acid form of these polymers in situ; however, this is not a preferred operation, since in situ neutralization requires preparation of the sulfonic acid in the organic solvent or the acid form of the ionic polymer must be dissolved in said organic liquid. The latter approach may involve handling of an acid form of an ionic polymer which has limited thermal stability. Therefore, it is quite apparent that the preparation and isolation of a neutralized ionic polymer affords the maximum latitude in formulation, less problems in handling polymers of limited thermal stability and maximum control over the final mixture of ionic polymer, polar cosolvent and organic solvent.

The organic solvent utilized in the instant invention is selected in relation to the ionomeric polymer solubility. Other factors to consider in selecting an organic solvent include cost, volatility, toxicity, convenience of handling, viscosity, and availability. A wide variety of such organic solvents are available which may be employed with sulfonated aromatic polymers such as aromatic hydrocarbons, chlorinated aromatic hydrocarbons, chlorinated aliphatic hydrocarbons, organic aliphatic esters and mixtures thereof. Organic solvents suitable for use with sulfonated elastomers such as sulfonated ethylene-propylene-diene terpolymers (Sulfo EPDM) are aliphatic hydrocarbons, aromatic hydrocarbons, paraffinic oils, naphthenic oils, low molecular weight oligomers such as squalene, aromatic oils wherein the aromatic content is 60% or less, diesel fuel, and mixtures of the preceding solvents.

The most preferred organic solvents for the instant invention are those based on various oils or diesel fuel for economic reasons, convenience, availability and toxicity. In particular, diesel fuel is preferred because it is also an excellent solvent for the preferred polymers in the presence of a suitable cosolvent.

Specific examples of organic solvents to be employed with various types of polymers are:

| Polymer | Organic Solvent |
| --- | --- |
| sulfonated polystyrene | benzene, toluene, ethyl benzene, methyl-ethyl ketone, xylene, styrene, ethylene dichloride, methylene chloride |
| sulfonated poly-t-butyl-styrene | benzene, toluene, xylene, ethyl, benzene, styrene, aliphatic oils, aromatic oils, hexane, heptane, decane, nonane, pentane |
| sulfonated ethylene-propylene terpolymer | aliphatic and aromatic solvents, oils such as "Solvent 100 Neutral" and "150 Neutral" (manufactured by Exxon Company U.S.A.O amd similar oils, benzene, diesel oil, toluene, xylene, ethyl benzene, pentane, hexane, heptane, octane, isooctane, nonane, decane |
| styrene-acrylic acid copolymers | aromatic solvents, ketone solvents tetrahydrofuran, dioxane, halogenated aliphatic e.g. methylene chloride |
| sulfonated polyisobutylene | saturated aliphatic hydrocarbons, diisobutylene, triisobutylene, aromatic and alkyl substitutes, aromatic hydrocarbons, chlorinated hydrocarbons, n-butyl ether, n-amyl ether, methyl oleate, aliphatic oils, oils predominantly paraffinic in nature and mixtures containing naphthenic hydrocarbons Solvent 100 Neutral, Solvent 150 Neutral (manufactured by Exxon Company U.S.A.) and all related oils, low molecular weight polymeric oils such as squalene, white oils and process oils having 60% or less aromatic content |

The polar cosolvent is incorporated with the organic solvent and ionomeric polymer to solubilize the pendant ionomeric groups. The polar cosolvent has a solubility parameter of at least 10.0, more preferably at least 11.0, is water miscible and may comprise from 0.1 to 40, preferably 0.5 to 20, weight percent of the total mixture of organic solvent, ionomeric polymer, and polar cosolvent. The solvent system of polar cosolvent and organic solvent in which the neutralized sulfonated polymer is dissolved contains less than about 15 weight percent of the polar cosolvent, more preferably about 5 percent. The viscosity of the solvent system is less than about 1,000 cps, more preferably less than about 100 cps and most preferably less than about 10 cps.

Normally, the polar cosolvent will be a liquid at room temperature, however, this is not a requirement. It is preferred that the polar cosolvent be soluble or mixable with the organic solvent at the levels employed in this invention. The polar cosolvent is selected from the group consisting essentially of water soluble alcohols, amines, di- or tri-functional alcohols, amides, acetamides, phosphates, or lactones and mixtures thereof. Especially preferred polar cosolvents are aliphatic alcohols such as methanol, ethanol, n-propanol, isopropanol, 1, 2 propane diol, monomethyl ether of ethylene glycol, and n-ethylformamide.

To permit cross-linking and gel formation, the amount of water added to the solution of neutralized sulfonated polymer, organic solvent and polar cosolvent having a viscosity of less than about 20,000 cps, may be about 5 to about 500 volume percent of water. It has generally been observed that increasing the amount of water with the polymer solution increases the strength of the gel. Levels of water in excess of 50 volume percent have been empolyed successfully and higher levels can be employed. The preferred levels of water are not believed to be critical provided that levels of greater than 5 volume percent are employed (based on volume of hydrocarbon-alcohol solution).

Various materials may be added to the polymer solution to increase gel strength, if desired. For example, the addition of clays, fillers (calcium carbonate, asbestos zinc oxide mica, talc), carbon blacks and the like can be employed to strengthen the gels.

Although foregoing discussion describes a method for plugging a wellbore, it should also be understood that the polymer solution described above can be used to plug the cracks, crevices, fissures and fractures ore pores through which drilling circulation fluids are escaping. The polymer solution may be introduced into the drill string and carried by the circulation fluid to the leaky formation through which the circulation fluid is being lost and the polymer solution will be carried along with the drilling mud into the crack, crevices or fissures of the leaky formation. Aqueous fluids in the cracks or crevices will mix with the polymer solution resulting in the formation of a jelly-like mass which effectively plugs and seals the leaky formation against the escape of circulation fluid. The amount of polymer solution injected should be sufficient to plug and block the crevices or fissures in the leaky formation without plugging the wellbore itself.

In another embodiment of the invention, the formation penetrated by a wellbore can be treated prior to carrying out fluid drive secondary recovery operations. This embodiment is particularly applicable where there is a good knowledge of the nature of the formation. Thus, in a formation where the oil-bearing strata are interspersed with more permeable porous strata which contain no oil, or an insufficient amount of oil to make secondary recovery operations economical, the polymer solution described above may be injected into the formation prior to initiating the fluid drive operation. The polymer solution is pumped down the well and into the formation in any suitable manner, any suitable amount, and for any desired period of time sufficient to obtain the desired formation penetration, decrease in mobility of the drive fluid, or decrease in permeability of the high permeability zones of the formation. Usually, a formation penetration of from a few inches (centimeters) to 100 feet (30 meters) or more from the injection well will be sufficient. However, this can vary from formation to formation and penetrations outside said ranges can be used.

In still another embodiment, the present invention can be applied to producing wells, either oil wells or gas wells, where there is a more porous nonhydrocarbon-bearing strata. For example, such a condition can exist where there is a water sand adjacent the hydrocarbon-bearing sand and the water intrudes into the borehole and interferes with the production of hydrocarbon. In such instances, the polymer solution described above may be injected into the formation to shut off the flow of water. The method of carrying out such a water shut-off treatment is substantially the same as described above in connection with fluid drive operations. The amount of polymer solution used to shutoff the water production will be limited to the volume that can be forced into the formation pore spaces. This amount will depend on the wellbore size, amount of formation penetrated by the wellbore, the formation porosity, and permeability to polymer flow. Upon injection of the polymer solution into both the water-bearing sand and the hydrocarbon-bearing sand, the polymer solution will not significantly increase in viscosity in the hydrocarbon sand but will gel and thus drammatically increase in viscosity in the water sand. The well is then produced and formation fluids from the hydrocarbon and flow as readily as before injection of the polymer into the formation, but flow of fluids from the water sand is effectively inhibited by the gelled polymer.

EXAMPLE 1

The following example illustrates the practice of instant invention on a laboratory scale. This example will describe (a) the preparation of a suitable polymer solution having a relatively low viscosity and (b) the gelation of this polymer solution by mixing with a relatively small amount of water accompanied by shear.

Solution Preparation: A sample of sulfonated ethylene-propylenediene terpolymer (Sulfo EPDM) was prepared by techniques disclosed in previous patents and applications (see U.S. Ser. no. 855,756). The Sulfo EPDM contained about 30 milliequivalents of sulfonate groups per 100 gm of polymer, and was neutralized with a zinc cation. The Sulfo EPDM backbone was based on 56 weight percent ethylene, 40 weight percent propylene and about 4 weight percent ethylidene norbornene, and was predominantly noncrystalline. Three polymer solutions were prepared using the polymer sample. The solutions were based on a mixture of diesel fuel and methanol and contained 5 gms of polymer in 100 ml of solvent mixture. The three solutions were prepared as follows:

| (A) | (B) | (C) |
|---|---|---|
| 20 gms Sulfo EPDM | 20 gms Sulfo EPDM | 20 gms Sulfo EPDM |
| 380 ml diesel fuel | 360 ml diesel fuel | 340 ml diesel fuel |
| 20 ml methanol | 40 ml methanol | 60 ml methanol |

Solutions of the Sulfo EPDM polymer were obtained by stirring for about two days at ambient temperature and three days at 50° C. All solutions were milky, moderately viscous and light tan in color. Table I below includes the viscosities for the three solutions with zero water content (i.e. before gelation).

Gelation With Water: Aliquots of the polymer solutions (A, B or C) in the amount of 50 ml were placed in 100 ml stainless steel beakers with varying amounts of water (1.25, 2.5, 5 or 10 ml) and subjected to high shear with a Dunmar High Speed Stirrer. Gelation was rapid with good mixing; in all cases shown the thickening was complete in less than one minute. The viscosities of the gelled materials are shown in Table I at the various water contents.

TABLE I

VISCOSITY OF SULFO-EPDM IN METHANOL/DIESEL SOLVENT AT VARIOUS METHANOL AND WATER LEVELS

| % Methanol | % Water | RPM | VISCOSITY* cps |
|---|---|---|---|
| Solution A | | | |
| 5 | 0 | 3 | 1300 |
| | | 1.5 | 1300 |
| | | 0.6 | 1300 |
| 5 | 2.5 | 0.3 | greater than 3,300,000 |
| 5 | 5 | 0.3 | greater than 3,300,000 |
| 5 | 10 | 0.3 | greater than 3,300,000 |
| 5 | 20 | 0.3 | greater than 3,300,000 |
| Solution B | | | |
| 10 | 0 | 3 | 1832 |
| | | 1.5 | 1832 |
| | | 0.6 | 1840 |
| 10 | 2.5 | 1.5 | 499,500 |
| | | 0.6 | 564,400 |
| | | 0.3 | 699,300 |
| 10 | 5 | 0.6 | 1,419,300 |
| | | 0.3 | 1,665,000 |
| 10 | 10 | 0.3 | greater than 3,300,000 |
| 10 | 20 | 0.3 | greater than 3,300,000 |
| Solution C | | | |
| 15 | 0 | 1.5 | 2720 |
| | | 0.6 | 2780 |
| | | 0.3 | 2840 |
| 15 | 2.5 | 3 | 174,825 |
| | | 1.5 | 189,810 |
| | | 0.6 | 207,500 |
| 15 | 5 | 1.5 | 449,550 |
| | | 0.6 | 581,000 |
| | | 0.3 | 649,350 |
| 15 | 10 | 0.3 | greater than 3,300,000 |

TABLE I-continued

VISCOSITY OF SULFO-EPDM IN METHANOL/DIESEL
SOLVENT AT VARIOUS METHANOL AND WATER LEVELS

| % Methanol | % Water | RPM | VISCOSITY* cps |
|---|---|---|---|
| 15 | 20 | 0.3 | greater than 3,300,000 |

*Viscosities were measured with a Brookfield viscometer. The un-gelled material was measured with a #1 spindle; for thegelled samples a TF spindle was used along with the Helipath stand attachment. This instrument cannot measure above 3,300,000 cps.

EXAMPLE 2

Figure 2:
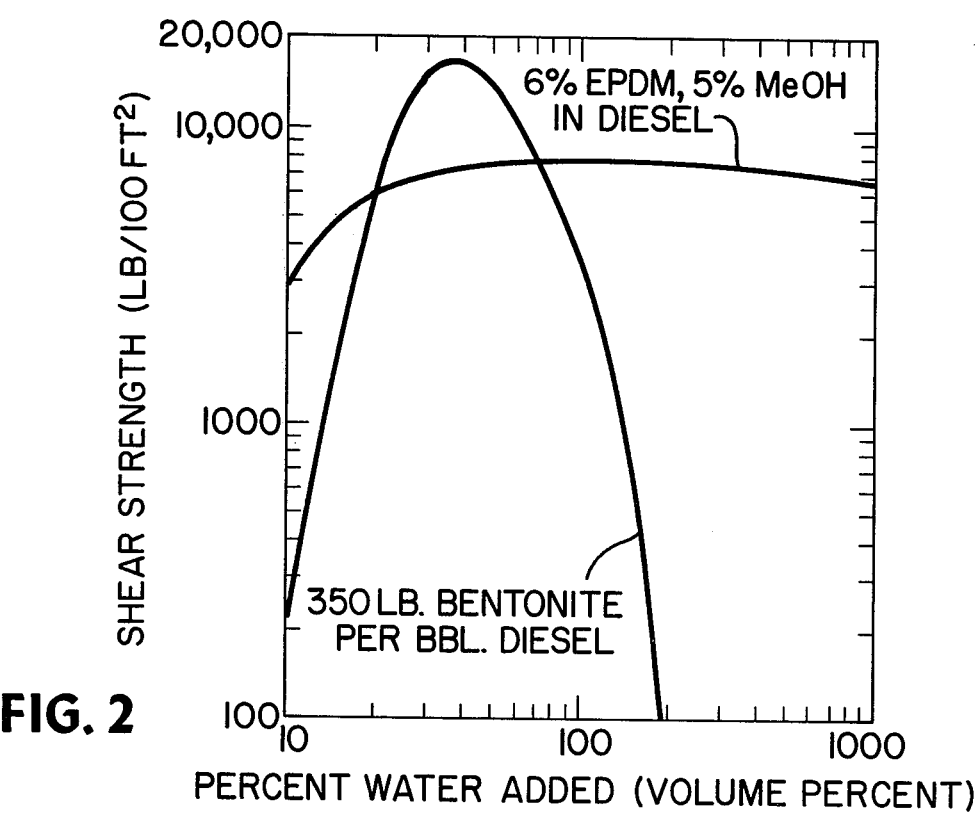
FIG. 2 shows the shear strength of a polymer solution of this invention and a diesel-bentonite solution as a function of water content. The shear strength units are lbs/100 ft$^2$, the same as commonly used in measuring yield point and gel strength of drilling fluids.

Tests were carried out to compare the shear strength of a polymer solution of this invention with a diesel/benonite slurry as a function of water content. The shear strength of several samples of a polymer solution comprising 6 weight percent sulfonated EPDM, 5 weight percent methanol in diesel oil and varying amounts of water were measured with a penetrometer-type device (specifically a shearometer tube, Baroid Part #242-05). The shear strength of several samples of a bentonite slurry comprising 350 lbs. of bentonite per barrel of diesel oil with varying amounts of water were added and measured in the same way. FIG. 2 illustrates the results of the shear tests.

The shear strength units in FIG. 2 are pounds per 100-foot square, the same as commonly used for measuring gel strength of drilling muds. It has been found that fluids having shear strength of about 3,000 pounds per 100-foot square are useful for well control and higher strengths are even better. FIG. 2 shows that the diesel/bentonite slurry (standard gunk) gives useful shear strengths roughly between only 0.5 and 3.0 volumes of water per volume of gunk. However, too much or too little water gives inadequate shear strength. The diesel oil/bentonite slurry has limited usefulness as a well control fluid because even after the bentonite gunk is hydrated to a high shear strength it is easily softened by further water additions to give a material with inadequate shear strength. As shown in FIG. 2, a polymer solution comprising 6% sulfonated EPDM and 5% methanol in diesel oil is useful above about 0.1 volumes of water per volume of polymer solution and the properties of the gelled polymer solution are substantially unaffected by additional volumes of water. The gel may be mixed with several volumes of water with the shear strength essentially unaffected by additional volumes of water.

EXAMPLE 3

The following test demonstrates the ability of the polymer solution of the present invention to gel in a fluid flow conduit when adequately mixed with water. The polymer solution used in this example was prepared by adding 150 pounds (71.6 kilograms) of Sulfo EPDM (which was zinc neutralized and had 30 meg/100 gms of sulfonate side-groups) to 300 gallons (1135 liters) of diesel fuel, mixing well, and then adding 16 gallons (60.5 liters) of methanol. After mixing for about 1 hour, the polymer solution was completely dissolved in the diesel-alcohol mixture. The resulting solution had a viscosity of 1400 cps at 75° F. (24° C.).

Water and the ionomeric polymer solution were simultaneously pumped through 600 feet (180 meters) of 2-inch (5.1 centimeters) pipe. The polymer solution and water were each pumped through the pipe at a rate of about 40 gallons (151 liters) per minute. At the pipe outlet, very little mixing of the polymer solution was observed. The polymer, methanol, and oil phase exited the pipe as large globules.

The water and substantially non-gelled polymer solution were then pumped through a 0.5 centimeter diameter orifice installed 200 feet from the entrance of a 600 foot (180 meter) pipe having a 2-inch (5.1 centimeters) diameter. The pressure drop across the orifice was about 600 psi (41 atmospheres). A short distance downstream of the orifice, the polymer solution was highly gelled and had a shear strength of about 180 lb/ft$^2$ (879 kgs/m$^3$).

EXAMPLE 4

This example illustrates how the polymer solution of this invention may be used to selectively plug water-bearing zones in a formation. A production well penetrates a 60-foot thick oil-bearing zone at a depth of 10,000 feet. A 10-foot thick high permeability water-bearing zone lies below the oil-bearing zone. In order to reduce the ratio of water-to-oil being produced, the well is given a treatment wherein about 500 gallons of a polymer solution comprising diesel oil, 3 weight percent Sulfo EPDM and 5 weight percent methanol is pumped into the tubing string and displaced down the tubing string with diesel oil or water. The polymer solution viscosity should have a viscosity less than 20,000 cps at 23° C. The tubing string shold be open-ended and the end should be adjacent the water-bearing zone. When the polymer solution starts to exit the tubing string, the annular space between the tubing string and casing should be closed to prevent return flow up the annular space. Continued pumping of fluids down the tubing string will force the polymer solution into the permeable water-bearing zone. About one hour after the polymer solution is displaced into the formation, the residual water in the formation pore space invaded by the polymer solution will cause gellation of the polymer. The gellation will block the invaded pore spaces and greatly reduce the permeability of the water zone. The well may then be returned to production without significant production of water from the water zone.

The principle of the invention and the best mode in which it is contemplated to apply that principle have been described. It is to be understood that the foregoing is illustrative only and that other means and techniques can be employed without departing from the time scope of the invention as defined in the following claims:

What is claimed is:

1. A method for treating a well penetrating a subterranean formation comprising introducing into said well a polymer solution which comprises a neutralized ionomeric polymer dissolved in an organic solvent and a polar cosolvent, said polymer having a backbone that is substantially soluble in the organic solvent said polar cosolvent solubilizing the pendant ionomeric groups, contacting said polymer solution with water to take up said polar cosolvent causing the polymer to aggregate and increase in viscosity sufficient to form a plugging material.

2. The method as defined in claim 1 wherein said neutralized ionomeric polymer has about 10 to about 200 milliequivalents of pendant neutralized sulfonated groups per 100 grams of polymer and said sulfonated groups are neutralized by a counterion selected from the group comprising ammonium or a metal counterion.

3. A method as defined in claim 2, wherein said metal counterion is selected from the group including antimony, tin, lead, ammonium, iron, and Group IA, IIA, IB, IIB of the Periodic Table of Elements.

4. A method as defined in claim 2, wherein said sulfonated groups are at least 90 mole percent neutralized.

5. A method as defined in claim 1 further comprises introducing water into said well simultaneously with introduction of said polymer solution into said well.

6. A method as defined in claim 5 further comprising passing said water and said polymer solution through a flow restriction in said well to mix said water and polymer solution, thereby causing said polymer to gel.

7. A method as defined in claim 1, wherein said polymer is selected from the group including polystyrene, t-butyl styrene, polyethylene, polypropylene, or styrene/acrylonitrile copolymer.

8. A method as defined in claim 1 wherein said polar cosolvent has a greater polarity than said organic solvent.

9. A method as defined in claim 1, wherein said polar cosolvent is selected from the group including aliphatic alcohols, aliphatic amines, di-or tri-functional aliphatic alcohols, phthalates, amides, acetomides, phosphates, or lactones and mixtures thereof.

10. A method as defined in claim 1 wherein said polar cosolvent is selected from the group including methanol, ethanol, propanol, or isopropanol, and mixtures thereof.

11. A method as defined in claim 1 wherein said organic solvent is selected from the group including aromatic hydrocarbons, ketones, chlorinated aliphatic hydrocarbons, aliphatic hydrocarbons, cyclic aliphatic ethers, aliphatic ethers or organic aliphatic esters and mixtures thereof.

12. A method as defined in claim 1 wherein said organic solvent is selected from the group including aliphatic hydrocarbons or aromatic hydrocarbons.

13. A method as defined in claim 1 wherein said organic solvent is selected from the group including benzene, toluene, ethyl benzene, xylene or styrene and mixtures thereof.

14. A method as defined in claim 1 wherein said organic solvent is selected from the group including diesel fuel, paraffinic oils, naphthenic oils, mixtures with aromatic oils wherein the aromatics content is sixty weight percent or less and mixtures of the preceding oils or mixtures with diesel fuel.

15. The method as defined in claim 1 wherein the polymer concentration ranges from about 0.1 to about 20 weight percent of the polymer solution.

16. The method as defined in claim 1 wherein the viscosity of the polymer solution introduced into the well is less than 20,000 cps and upon mixing with water the viscosity increases to greater than 500,000 cps.

17. In the drilling of a well, the method of placing a plug within said well comprising introducing into a drill string within said well a polymer solution comprising a neutralized ionomeric polymer dissolved in a nonpolar organic solvent and a polar cosolvent, the polymer is characterized as having a backbone that is substantially soluble in the organic solvent and pendant ionomeric group that are substantially insoluble in the organic solvent, the polar cosolvent solubilizing the pendant ionomeric groups such that the polymer solution introduced into the well has a viscosity less than about 20,000 centipoises; and circulating said polymer solution down said drill string and into said well, and water in the well being in sufficient quantity to cause the polymer to cross-link and gel into semi-solid plastic mass.

18. The method as defined in claim 17 wherein said polymer solution is introduced in an amount sufficient to introduce from 50 to 1000 feet of polymer into the wellbore.

19. The method as defined in claim 17 wherein a nonaqueous fluid is circulated down the drill string ahead of the polymer solution.

20. A method as defined in claim 17 wherein said neutralized ionomeric polymer is derived from an unsaturated elastomer.

21. A method as defined in claim 17 wherein said neutralized ionomeric polymer is derived from an ethylene-propylene terpolymer.

22. A method as defined in claim 17 wherein the polymer concentration ranges from about 0.1 to about 20 weight percent of the polymer solution.

23. The method of claim 17 wherein the neutralized ionic polymer is sulfonated ethylene-propylene terpolymer, the nonpolar organic solvent is diesel fuel, the polar cosolvent is selected from the group consisting of methanol, ethanol, or isopropanol, and the polymer solution has a viscosity ranging from 400 to 20,000 cps at 25° C. prior to gelation.

24. A method of placing a plug within a well containing an aqueous fluid comprising introducing into the wellbore a polymer solution which comprises a neutralized ionomeric polymer dissolved in an organic liquid and a polar cosolvent, said polymer having a backbone that is substantially soluble in the organic liquid and pendant ionomeric groups that are substantially insoluble in the organic liquid, said polar cosolvent solubilizing the pendant ionomeric groups such that the polymer solution introduced into the well has a viscosity less than than 20,000 centipoises and upon contact with water in the well the polar cosolvent is taken up by the water in the well causing the polymer to aggregate and increase in viscosity sufficient to form a plug in the well.

25. In the drilling of a well, the method of placing a plug within said well comprising simultaneously introducing into a drill string within said well water and a polymer solution comprising a neutralized ionomeric polymer dissolved in a nonpolar organic liquid and a polar cosolvent, the polymer is characterized as having a backbone that is substantially soluble in the organic liquid and pendant ionomeric group that are substantially insoluble in the organic liquid, the polar cosolvent solubilizing the pendant ionomeric groups such that the polymer solution introduced into the well has a viscosity less than about 20,000 centipoises, and circulating said water and polymer solution down said drill string and into said well, said water being in sufficient quantity to cause the polymer to cross-link and gel into semi-solid plastic mass.

26. The method as defined in claim 25 further comprises mixing said water and said polymer upon passage of said water and polymer out of said drill string.

27. A method of selectively shutting off water in a well that penetrates hydrocarbon and water bearing formations comprising injecting into the pore spaces of the formation a polymer solution which comprises a neutralized ionomeric polymer dissolved in an organic liquid and a polar cosolvent, said polymer having a backbone that is substantially soluble in the organic liquid and pendant ionomeric groups that are substantially insoluble in the organic liquid, said polar cosolvent solubilizing the pendant ionomeric groups such that the polymer solution introduced into the well has a viscosity less than about 20,000 centipoises and upon mixing with water in the formation the polar cosolvent is taken is taken up by the water causing the polymer to aggregate and increase in viscosity sufficient to form a plugging material.

28. A method of reducing loss of circulation of a fluid used in drilling a hole in an underground formation which comprises a neutralized ionomeric polymer dissolved in an organic liquid and a polar cosolvent, said polymer having a backbone that is substantially soluble in the organic liquid and pendant ionomeric groups that are substantially insoluble in the organic liquid, said polar cosolvent solubilizing the pendant ionomeric groups such that the polymer solution introduced into the well has a viscosity less than about 20,000 centipoises and upon mixing with water in the well the polar cosolvent is taken up by the water causing the polymer to aggregate and increase in viscosity sufficient to form a plugging material.

* * * * *